(12) United States Patent
Kim et al.

(10) Patent No.: US 12,133,316 B2
(45) Date of Patent: Oct. 29, 2024

(54) INDUCTION HEATING APPARATUS

(71) Applicant: SAMSUNG ELECTRONICS CO., LTD., Suwon-si (KR)

(72) Inventors: Bumsoo Kim, Suwon-si (KR); Youngmin Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 455 days.

(21) Appl. No.: 17/220,207

(22) Filed: Apr. 1, 2021

(65) Prior Publication Data

US 2021/0315063 A1    Oct. 7, 2021

(30) Foreign Application Priority Data

Apr. 1, 2020 (KR) .......................... 10-2020-0039859

(51) Int. Cl.
*H05B 6/06* (2006.01)
*C04B 35/19* (2006.01)
(Continued)

(52) U.S. Cl.
CPC ............. *H05B 6/062* (2013.01); *C04B 35/19* (2013.01); *C04B 35/195* (2013.01); *C04B 41/86* (2013.01); *H05B 6/1245* (2013.01); *C04B 35/622* (2013.01); *C04B 2235/3203* (2013.01); *C04B 2235/3206* (2013.01); (Continued)

(58) Field of Classification Search
CPC ....... C04B 37/00; C04B 35/195; C04B 41/86; C04B 33/34; C04B 35/19; C04B 2235/349; C04B 2235/3481; C04B 2237/704; C04B 2235/77; C04B 2235/9607; C04B 2235/3203; C04B 35/622; C04B 2235/3206; C04B 2235/3472;
(Continued)

(56) References Cited

U.S. PATENT DOCUMENTS 6,139,942 A    10/2000 Hartness et al.
8,715,817 B2    5/2014 Striegler et al.
(Continued)

FOREIGN PATENT DOCUMENTS

CN    103003210 A    3/2013
CN    108912675 A  * 11/2018
(Continued)

OTHER PUBLICATIONS

International Search Report dated Jul. 20, 2021 in in International Patent Application No. PCT/KR2021/003903.
(Continued)

*Primary Examiner* — Dana Ross
*Assistant Examiner* — Kuangyue Chen
(74) *Attorney, Agent, or Firm* — STAAS & HALSEY LLP

(57) ABSTRACT

An induction heating apparatus is disclosed. The disclosed induction heating apparatus includes: a cooking plate on which a cooking container is seated; and a plurality of induction heating coils installed below the cooking plate and configured to generate a magnetic field, wherein the cooking plate includes: a sintered ceramic plate material; and a reinforcement material layer disposed on a lower surface of the sintered ceramic plate material and provided by a fabric woven with an industrial fiber and a polyamide-based resin.

20 Claims, 7 Drawing Sheets

(51) Int. Cl.
*C04B 35/195* (2006.01)
*C04B 41/86* (2006.01)
*H05B 6/12* (2006.01)
*C04B 35/622* (2006.01)

(52) U.S. Cl.
CPC .................. *C04B 2235/3472* (2013.01); *C04B 2235/3481* (2013.01); *C04B 2235/349* (2013.01)

(58) Field of Classification Search
CPC .......................... C04B 2237/341; H05B 6/062; H05B 6/1209; H05B 6/1245; D01F 9/12; Y02B 40/00
See application file for complete search history.

(56) References Cited

U.S. PATENT DOCUMENTS

| | | | |
|---|---|---|---|
| 9,035,738 B2 | 5/2015 | Lee et al. | |
| 9,051,212 B2 | 6/2015 | Demol et al. | |
| 10,076,718 B2* | 9/2018 | Hidaka | B01D 46/0036 |
| 10,542,590 B2 | 1/2020 | Laurent et al. | |
| 2007/0074657 A1* | 4/2007 | Hamayoshi | C04B 35/593 |
| | | | 118/420 |
| 2009/0081555 A1* | 3/2009 | Teramoto | H01M 6/185 |
| | | | 429/322 |
| 2009/0197026 A1 | 8/2009 | Vilato et al. | |
| 2012/0187112 A1* | 7/2012 | Demol | F24C 7/083 |
| | | | 219/649 |
| 2014/0165875 A1* | 6/2014 | Chaivacci | C04B 41/86 |
| | | | 106/170.57 |
| 2016/0175753 A1 | 6/2016 | Hidaka et al. | |
| 2019/0390449 A1* | 12/2019 | Kobayashi | C04B 41/52 |
| 2022/0021007 A1* | 1/2022 | Lee | H01M 4/8647 |
| 2022/0064407 A1* | 3/2022 | Stanger | C08K 7/06 |

FOREIGN PATENT DOCUMENTS

| | | |
|---|---|---|
| DE | 102009000304 | 1/2016 |
| FR | 2 872 507 | 1/2006 |
| JP | 10-335055 | 12/1998 |
| JP | 3857735 | 12/2006 |
| KR | 10-2007-0020014 | 2/2007 |
| KR | 10-1047355 | 7/2011 |
| KR | 10-1170816 | 8/2012 |
| KR | 10-1385891 | 4/2014 |
| KR | 10-1467563 | 12/2014 |
| WO | WO 2022/090670 A1 | 5/2022 |

OTHER PUBLICATIONS

Extended European Search Report dated Nov. 14, 2022 in European Patent Application No. 21781216.3 (8 pages).
Korean Office Action dated Jun. 21, 2024 for Korean Application No. 10-2020-0039859.

* cited by examiner

INDUCTION HEATING APPARATUS

CROSS-REFERENCE TO RELATED APPLICATION

This application claims the benefit of Korean Patent Application No. 10-2020-0039859, filed on Apr. 1, 2020 in the Korean Intellectual Property Office, the disclosure of which is incorporated herein by reference.

BACKGROUND

1. Field

Embodiments of the present disclosure relate to an induction heating apparatus using a heating coil, and more particularly, to an induction heating apparatus including a cooking plate having an improved structure to ensure strength and heat-resistant properties.

2. Description of the Related Art

Induction heating apparatuses are cooking apparatuses configured to heat and cook foods using the principle of induction heating. The induction heating apparatus includes a cooking plate on which a cooking container is placed and an induction coil configured to generate a magnetic field when a current is applied thereto.

When the current is applied to the coil to generate the magnetic field, a secondary current is induced in the cooking container, and Joule heat is generated by a resistance component of the cooking container itself. Thus, the cooking container is heated by a high-frequency current, and the food contained in the cooking container is cooked.

Regarding the induction heating cooker, the heat efficiency (heat efficiency of the cooking container) of a gas range is about 45% whereas the heat efficiency of the induction heating cooker is high as about 90%, and thus cooking time can be saved.

Further, since the induction heating cooker uses the cooking container itself as a heat source, as compared to a gas range or kerosene stove configured to combust fossil fuels and heat the cooking container through the combustion heat, the induction heating cooker does not generate harmful gases, is safe due to no risk of fire, and is easily cleaned because foods are not attached, and thus the market thereof is expanding.

SUMMARY

In accordance with one aspect of the present disclosure, an induction heating apparatus includes a cooking plate on which a cooking container is seated, and a plurality of induction heating coils installed below the cooking plate and configured to generate a magnetic field, wherein the cooking plate includes a sintered ceramic plate material, and a reinforcement material layer disposed on a lower surface of the sintered ceramic plate material and provided by impregnating a polyamide-based resin into an industrial fiber.

The thermal expansion coefficient of the sintered ceramic plate material may be in the range of $10^{-6} \cdot K^{-1}$ to $3 * 10^{-6} \cdot K^{-1}$.

The thickness of the sintered ceramic plate material may be in the range of 3 mm to 12 mm.

The sintered ceramic plate material may be provided by mixing clay with $Li_2O$—$Al_2O_3$-$SiO_2$ (LAS) or MgO—$Al_2O_3$-$SiO_2$ (MAS).

The cooking plate may further include a glaze coating layer formed on one surface of the sintered ceramic plate material.

The industrial fiber may include one or more selected from the group including an aramid fiber, a carbon fiber, and a glass fiber.

The weight ratio of the industrial fiber may be in the range of 200 $g/m^2$ to 800 $g/m^2$.

The aramid fiber may include a p-aramid fiber that is prepared by polymerizing p-phenylene diamine (PPD) and terephthaloyl chloride (TPC).

The industrial fiber may be provided by weaving an aramid fiber in the range of 1,000 denier to 6,000 denier.

The glass fiber may include one or more selected from the group including $Al_2O_3$, $SiO_2$, and CaO.

The glass fiber may further include one or more selected from the group including $B_2O_3$, F, MgO, and $Fe_2O_3$.

The carbon fiber may be provided by using a polyacrilonitrile (PAN)-based fiber as a yarn.

The polyamide-based resin may be provided in a powder form.

The decomposition temperature of the polyamide-based resin may be 300° C. or more.

The sintered ceramic plate material may be provided by being pressed with a continuous high pressure belt press apparatus and by being subjected to a drying process, a glazing process, and a sintering process.

The sintering temperature may be in the range of 1,000° C. to 1,300° C.

The ratio of an area occupied by pores per unit surface area of the sintered ceramic plate material may be in the range of 10% to 15%.

The thickness of the reinforcement material layer may be in the range of 0.1 mm to 1.0 mm.

The bending strength of the cooking plate according to JIS A 1509-4 standard may be 600 N or more.

The cooking plate may be provided by stacking the sintered ceramic plate material on the reinforcement material layer at 150° C. to 250° C.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
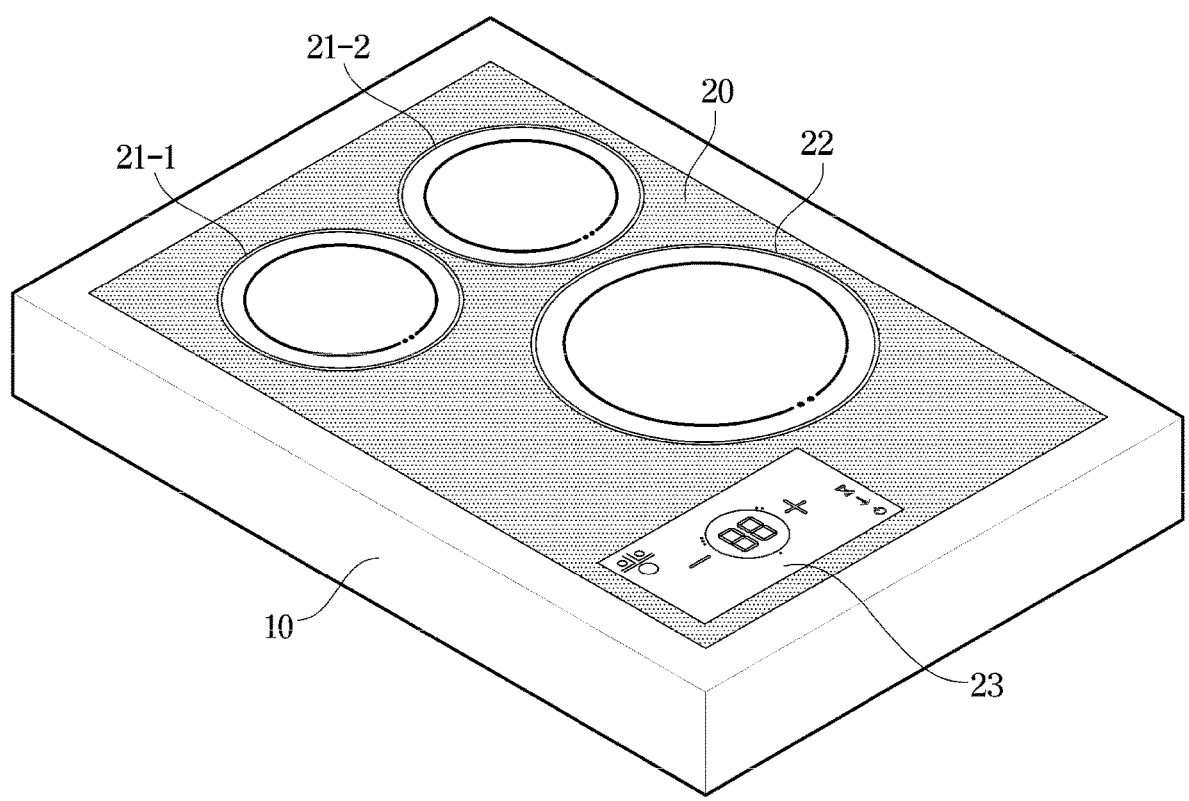
FIG. 1 is a view illustrating an exterior of an induction heating apparatus according to an embodiment of the present disclosure.

Since embodiments described in the present specification are merely the most exemplary embodiments of the present disclosure and do not represent all the technical spirit of the present disclosure, it should be understood that various equivalents or modifications that can replace the embodiments at a time of filing are included in the scope of the present disclosure.

A singular expression used in the description may include a plural expression unless the context is clearly indicated. In the drawings, the shapes and the sizes of elements may be exaggeratedly illustrated for clear description.

It should be understood in the present specification that terms such as "include" or "have" are intended to indicate the presence of features, numbers, steps, operations, components, parts, or combinations thereof that are described in the specification and do not exclude in advance the possibility of the presence or addition of one or more other features, numbers, steps, operations, components, parts, or combinations thereof.

Therefore, it is an aspect of the present disclosure to provide an induction heating apparatus including a cooking plate having an improved structure to secure strength and heat-resistant properties.

Hereinafter, exemplary embodiments of the present disclosure will be described in detail with reference to the accompanying drawings.

FIG. 1 is a view illustrating an exterior of an induction heating apparatus according to an embodiment of the present disclosure.

Referring to FIG. 1, an induction heating apparatus 1 includes a main body 10 that forms the exterior of the induction heating apparatus 1 and in which various components constituting the induction heating apparatus 1 are installed. The main body 10 may be provided in a box shape with an open upper surface.

A cooking plate 20 having a flat plate shape on which a cooking container may be placed may be provided on the upper surface of the main body 10.

In the related art, heat-resistant glass having a thermal expansion coefficient of $0.5*10^{-6} \cdot K^{-1}$ that is lower than a thermal expansion coefficient ($9.0*10^{-6} \cdot K^{-1}$) of general glass is mainly used as a material of a top plate, that is, the cooking plate 20, of an induction heating cooker. However, the transparent heat-resistant glass has a low degree of freedom in a pattern of the exterior, and thus pattern design is limited.

Meanwhile, the material applied to the top plate of the induction heating cooker should have a low thermal expansion coefficient for protection against thermal shock. In the present disclosure, a sintered ceramic plate is introduced in order to increase the degree of freedom in the pattern of the exterior while maintaining the heat-resistant properties required by the induction heating cooker.

Meanwhile, in order to replace the heat-resistant glass used as an existing material, it is required to secure mechanical properties, for example, free fall impact strength, bending strength, and the like, of a sintered ceramic plate material at levels larger than or equal to those of the heat-resistant glass. Accordingly, in the present disclosure, a separate reinforcement material layer 25 that may reinforce the strength of a sintered ceramic plate material 24 is introduced.

Functions of the sintered ceramic plate material 24 and the reinforcement material layer 25 constituting the cooking plate 20 will be described in more detail.

Meanwhile, guide marks 21-1, 21-2, and 22 (guide mark 21 in FIG. 4) configured to guide a user to a location in which the cooking container may be heated may be formed on the cooking plate 20. Hereinafter, it is described that the number of guide marks is three, but the number of guide marks is not limited thereto, and any number of two or more guide marks may be included without limitation.

Further, a user interface 23 configured to receive a control command from the user and display operation information of the induction heating apparatus 1 may be provided on one side of the cooking plate 20. However, the location of the user interface 23 is not limited to the cooking plate 20, and the user interface 23 may be provided in various locations such as the front surface and/or the side surfaces of the main body 10.

Figure 2:
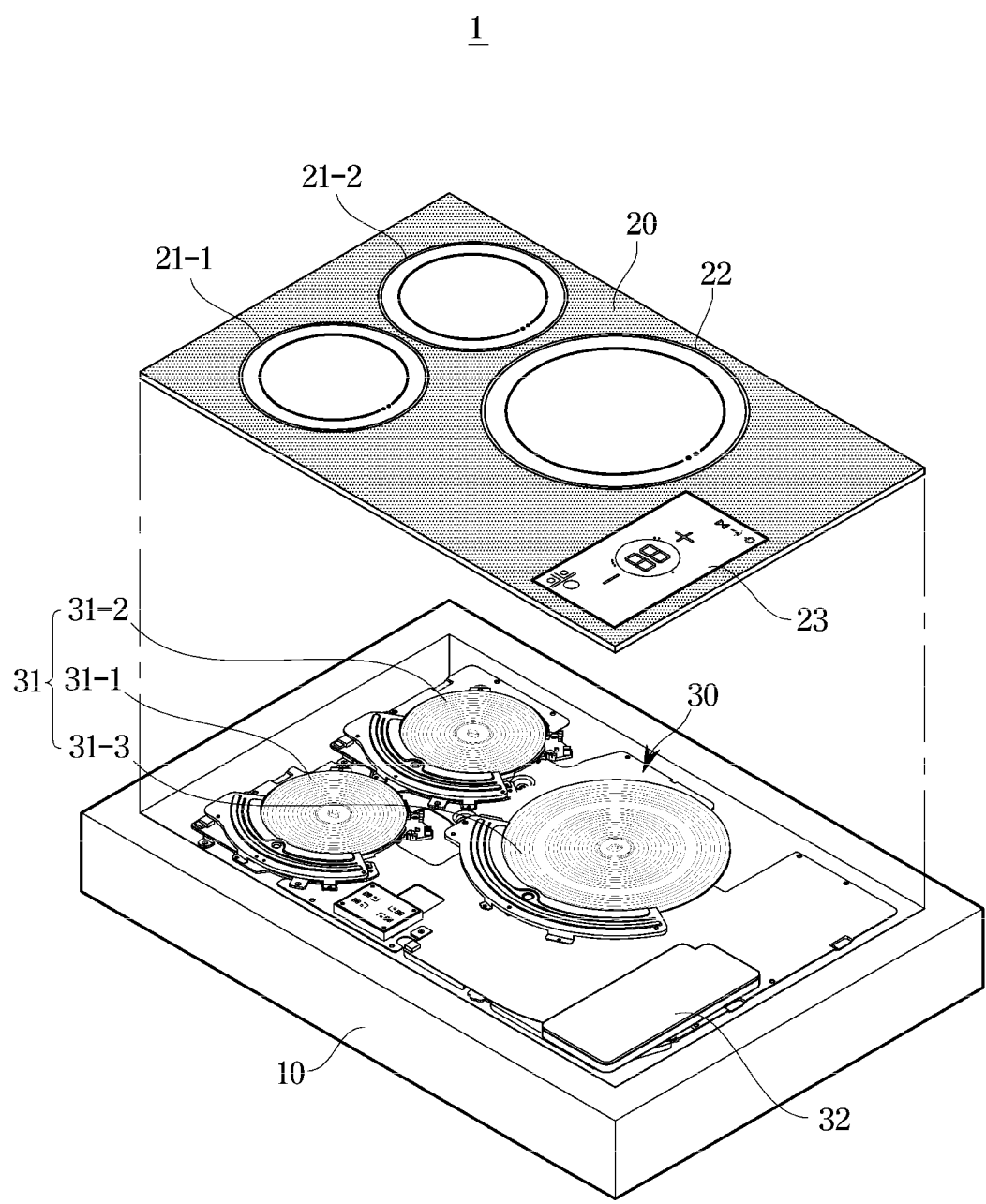
FIG. 2 is a view illustrating a state in which a main body and a cooking plate of an induction heating cooker are separated according to the embodiment of the present disclosure.

FIG. 2 is a view illustrating a state in which a main body and a cooking plate of an induction heating cooker are separated according to the embodiment of the present disclosure.

Referring to FIG. 2, the induction heating apparatus 1 includes a heating layer 30 including a plurality of induction heating coils 31-1, 31-2, and 31-3; 31 provided below the cooking plate 20 and configured to heat the cooking container placed on the cooking plate 20, and a main assembly 32 implementing the user interface 23 and accommodating various electronic components.

The plurality of induction heating coils 31 are heated by electromagnetic induction to heat the cooking container seated on the cooking plate 20.

The induction heating coil 31 includes a coil wound in a substantially circular shape to form a magnetic field in a vertical direction when a current is applied thereto. The induction heating coil 31 is used as a heat source and is disposed below the cooking plate 20 to transfer heat to the cooking plate 20. The cooking container such as a pot is heated by heat conducted to the cooking plate 20. In the present disclosure, the induction heating coil 31 has been described as a heat source, but instead of the induction heating coil 31, an induction heater using an induction heating method or a radiant heater using an electrical resistance method may be used as the heat source.

Figure 4:
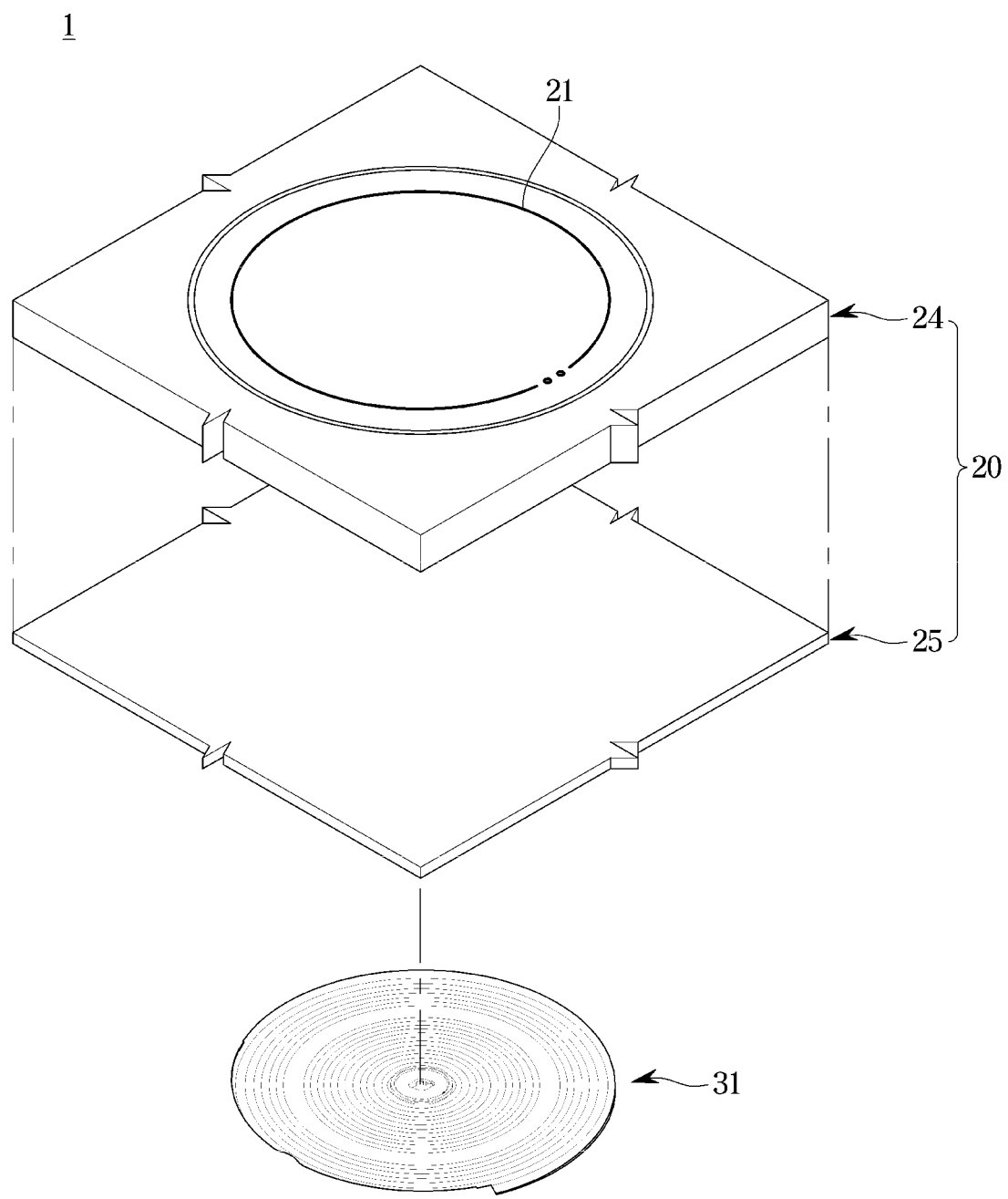
FIG. 4 is an exploded perspective view illustrating a configuration of the cooking plate and an induction heating coil of the induction heating apparatus according to the embodiment of the present disclosure.
Figure 5:
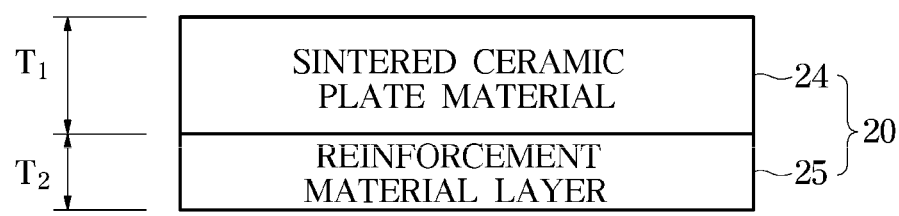
FIG. 5 is a view illustrating a structure of the cooking plate according to the embodiment of the present disclosure.

In this case, the plurality of induction heating coils 31 may be provided at locations corresponding to the guide marks 21-1, 21-2, and 22 (guide mark 21 in FIG. 4).

In detail, the plurality of induction heating coils 31 may include one first induction heating coil 31-1, another first induction heating coil 31-2, and one second induction heating coil 31-3.

It is illustrated in FIGS. 1 and 2 that the two first induction heating coils 31-1 and 31-2 and the one second induction heating coil 31-3 are provided, but the present disclosure is not limited thereto, and the induction heating apparatus 1 may include at least one first induction heating coil 31-1 and at least one second induction heating coil 31-3.

That is, one or more first induction heating coils 31-1 and 31-2 and one or more second induction heating coils 31-3 included in the induction heating apparatus 1 may be included without limitation.

Each of the plurality of induction heating coils 31 may generate a magnetic field and/or an electromagnetic field for heating the cooking container.

Figure 3:
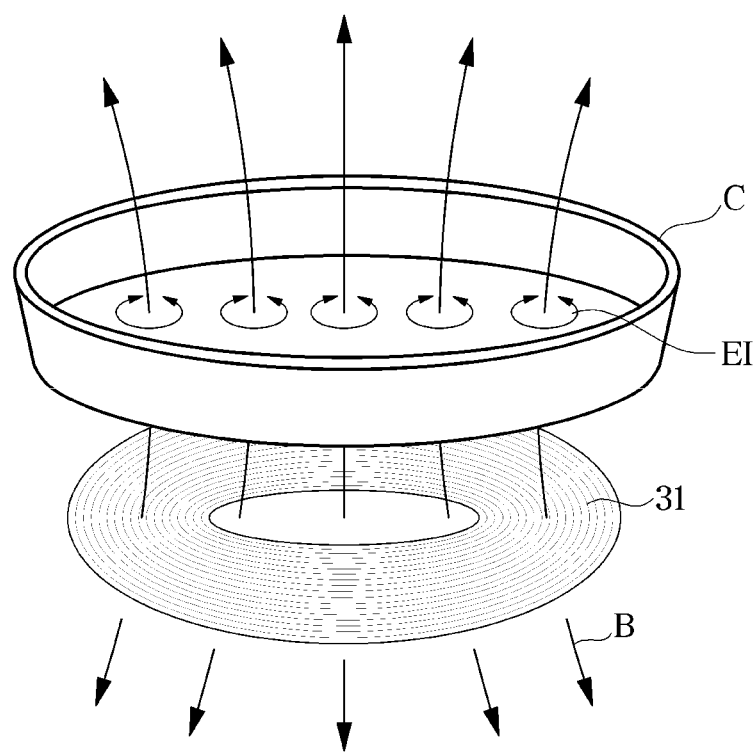
FIG. 3 is a view illustrating a principle of heating a cooking container by the induction heating apparatus according to the embodiment of the present disclosure.

For example, when a driving current is supplied to the induction heating coil 31, a magnetic field B may be induced around the induction heating coil 31, as illustrated in FIG. 3.

In particular, when a current whose size and direction changes over time, that is, an alternating current, is supplied to the induction heating coil 31, a magnetic field B whose size and direction changes over time may be induced around the induction heating coil 31.

The magnetic field B around the induction heating coil 31 may pass through the cooking plate 20 made of tempered glass and may reach the cooking container C placed on the cooking plate 20.

Due to the magnetic field B whose size and direction changes over time, an eddy current El rotating about the magnetic field B may be generated in the cooking container C. In this way, a phenomenon in which an eddy current is generated due to the magnetic field B that changes over time is referred to as an electromagnetic induction phenomenon. Electrical resistance heat may be generated in the cooking container C due to the eddy current El. The electrical resistance heat, which is heat generated in a resistor when a current flows in the resistor, is also known as Joule heat. By such electrical resistance heat, the cooking container C may be heated and a cooking object contained in the cooking container C may be heated.

In this way, each of the plurality of induction heating coils 31 may heat the cooking container C using the electromagnetic induction phenomenon and the electrical resistance heat.

Further, the heating layer 30 may include the main assembly 32 located below the user interface 23 provided on one side of the cooking plate 20 and implementing the user interface 23.

The main assembly 32 may be a printed board assembly (PBA) including a display for implementing the user interface 23, a switching element, an integrated circuit element, and a printed circuit board (PCB) on which these components are installed.

The location of the main assembly 32 is not limited to that illustrated in FIG. 2, and the main assembly 32 may be disposed at any location. For example, when the user interface 23 is installed on the front surface of the main body 10, the main assembly 32 may be disposed on the rear side of the front surface of the main body 10 separately from the heating layer 30.

A printed circuit board assembly (not illustrated) for operating the plurality of induction heating coils 31 may be provided below the plurality of induction heating coils 31. A driving circuit for supplying driving currents to the plurality of induction heating coils 31, a control circuit for controlling the operation of the plurality of induction heating coils 31, and the like may be provided in the plurality of printed circuit board assemblies.

As described above, the induction heating apparatus 1 may include the cooking plate 20, the plurality of induction heating coils 31 for heating the cooking container, and the driving circuit and control circuit for operating the plurality of induction heating coils 31.

Hereinafter, configurations and a function of each configuration of the cooking plate 20 will be described in more detail.

In the present embodiment, as illustrated in FIGS. 2 and 3, an example of an induction heating apparatus having three cooking regions is illustrated. In this case, since all induction coil units corresponding to the cooking regions have the same configuration, for convenience of description, only a configuration of one cooking region is illustrated and described.

FIG. 4 is an exploded perspective view illustrating a configuration of the cooking plate and an induction heating coil of the induction heating apparatus according to the embodiment of the present disclosure. Referring to FIG. 4, the reinforcement material layer 25 is bonded to the lower surface of the sintered ceramic plate material 24.

The cooking plate 20 according to the disclosed embodiment may include the sintered ceramic plate material 24 and the reinforcement material layer 25 disposed on the lower surface of the sintered ceramic plate material 24 and made of a fabric woven with industrial fibers and a polyamide-based resin.

The sintered ceramic plate material 24 may have a flat plate shape so that the cooking container may be placed thereon and may be made of a material having a low thermal expansion coefficient. For example, the sintered ceramic plate material 24 may be made of a material having a thermal expansion coefficient of $10^{-6} \cdot K^{-1}$ to $3*10^{-6} \cdot K^{-1}$ in order to satisfy heat-resistant conditions required as a material of a top plate of the induction heating apparatus.

According to the disclosed embodiments, the sintered ceramic plate material 24 may be provided by mixing clay with $Li_2O$—$Al_2O_3$—$SiO_2$ (LAS) or $MgO$—$Al_2O_3$—$SiO_2$ (MAS), which is a base material.

As the content of the ceramic material such as $Li_2O$—$Al_2O_3$—$SiO_2$ (LAS) or $MgO$—$Al_2O_3$—$SiO_2$ (MAS) becomes higher, heat-resistant properties become better. In other words, as the content of the ceramic material becomes higher, the thermal expansion coefficient of the sintered ceramic plate material 24 becomes lower. This is because the $Li_2O$—$Al_2O_3$—$SiO_2$ (LAS) or $MgO$—$Al_2O_3$—$SiO_2$ (MAS) material has the property of low thermal expansion due to the coexistence of ionic and covalent bonds, and thus a thermal expansion coefficient may be lowered.

In the present disclosure, in order to ensure the heat-resistant properties of the sintered ceramic plate material 24 applied to the cooking plate 20, it was intended to secure a content of 50% or more of the $Li_2O$—$Al_2O_3$—$SiO_2$ (LAS) or $MgO$—$Al_2O_3$—$SiO_2$ (MAS), in weight %.

Considering only the heat-resistant properties, as the content of $Li_2O$—$Al_2O_3$—$SiO_2$ (LAS) or $MgO$—$Al_2O_3$—$SiO_2$ (MAS) becomes higher, the heat-resistant properties become better. However, when the content of $Li_2O$—$Al_2O_3$—$SiO_2$ (LAS) or $MgO$—$Al_2O_3$—$SiO_2$ (MAS) is too high, it may be difficult to secure sufficient processability for preparing the sintered ceramic plate material 24. In the present disclosure, when mixing clay with $Li_2O$—$Al_2O_3$—$SiO_2$ (LAS) or $MgO$—$Al_2O_3$—$SiO_2$ (MAS), in order to secure fluidity, an upper limit of the content of $Li_2O$—$Al_2O_3$—$SiO_2$ (LAS) or $MgO$—$Al_2O_3$—$SiO_2$ (MAS) was limited to 90%.

Meanwhile, the sintered ceramic plate material 24 may be provided to have a thickness of 3 mm to 12 mm by being pressed with a continuous high pressure belt pressing apparatus at a high temperature. Thereafter, the final sintered ceramic plate material 24 may be manufactured through a drying process, a glazing process, and a sintering process.

In this case, the sintering temperature may be limited to 1,000° C. or higher in consideration of a glaze coating process. However, when the sintering temperature is excessively high, cracks occur in a glaze coating layer, and thus an upper limit of the sintering temperature was limited to 1,300° C.

Further, the glaze coating layer may be disposed on one surface of the sintered ceramic plate material 24, and in more detail, the sintered ceramic plate material 24 may have a gloss of 95 or more due to polishing and glazing treatment.

Meanwhile, the porosity of the sintered ceramic plate material 24 may be in the range of 10 to 15%. The porosity means a ratio of an area occupied by pores per unit surface area. However, the porosity range of a porous ceramic substrate 210 is not limited to the above-described examples, and the porosity range may be appropriately adjusted in order to adjust odor permeation and color permeation according to the embodiment.

When the sintered ceramic plate material 24 is applied to the cooking plate 20 of the induction heating apparatus 1 according to the disclosed disclosure, the glaze coating layer formed on one surface of the sintered ceramic plate material 24 may be disposed to face the cooking container, and the reinforcement material layer 25 formed on the other surface of the sintered ceramic plate material 24, which will be described below, may be disposed to face the induction heating coil 31.

The reinforcement material layer 25 is a layer provided to reinforce the strength of the sintered ceramic plate material 24, and in the present disclosure, the reinforcement material layer 25 is made of the polyamide-based resin having excellent heat resistance properties and a fabric woven with industrial fibers that can be impregnated with the polyamide-based resin.

The polyamide-based resin is a hydrophobic polymer and is a crystalline plastic having excellent mechanical properties, especially, excellent impact properties.

In the present disclosure, a polyamide-based resin having a thermal decomposition temperature of 300° C. or higher measured by thermogravimetric analysis (TGA) is applied for use as a top plate material of the induction heating apparatus 1, and thus the heat-resistant properties of the induction heating apparatus 1 can be secured.

Meanwhile, the polyamide-based resin may be provided in a powder form to minimize harmful substances caused by use of a solvent.

The weight ratio of the industrial fiber may be selected in the range of 200 g/m² to 800 g/m².

The sintered ceramic plate material 24 has a problem in that physical property conditions, such as bending strength and free fall impact strength, which are required as the top plate material of the induction heating apparatus 1, are inferior. Accordingly, in the present disclosure, an industrial fiber having a weight ratio of 200 g/m² or more was introduced to reinforce the strength of the cooking plate 20. However, when the weight ratio of the industrial fiber is excessive, the cooking plate 20 becomes thick, and accordingly, a section in which the magnetic field moves is lengthened. Thus, magnetic efficiency cannot be secured during induction heating, and the upper limit of the weight ratio of the fiber was limited to 800 g/m².

The industrial fiber may include one or more selected from the group including an aramid fiber, a carbon fiber, and a glass fiber.

The aramid fiber, which is an industrial fiber according to an embodiment, may include a p-aramid fiber produced by polymerizing p-phenylene diamine (PD) and terephthaloyl chloride (TPC).

Figure 6:
FIG. 6 is a view illustrating a process of polymerizing a p-aramid fiber according to the embodiment of the present disclosure.

A process of polymerizing the p-aramid fiber is illustrated in FIG. 6.

Referring to FIG. 6, a p-aramid resin (PPD-T) may be prepared by polymerizing p-phenylene diamine (PPD) and terephthaloyl chloride (TPC).

The polymerized p-aramid resin (PPD-T) is prepared into the p-aramid fiber through an air-gap wet spinning process, a washing process, a neutralization process, a drying process, and a winding process.

When the reinforcement material layer 25 is provided as an aramid fiber woven fabric, the aramid fiber woven fabric may be prepared using an aramid fiber in the range of 1,000 denier to 6,000 denier.

A carbon fiber, which is an industrial fiber according to another embodiment, is a material having characteristics such as a light weight, high strength, and high heat-resistant properties and is generally prepared by thermally converting a precursor fiber.

According to the disclosed embodiment, the carbon fiber may be provided by using a polyacrilonitrile (PAN)-based fiber as a yarn.

The PAN fiber, which is known as the most suitable precursor used in preparing the carbon fiber, may be finally converted into the carbon fiber through a series of a stabilization or oxidation process, a carbonization process, optionally a graphitization process and a series of a surface treatment process and a sizing process.

Figure 7:
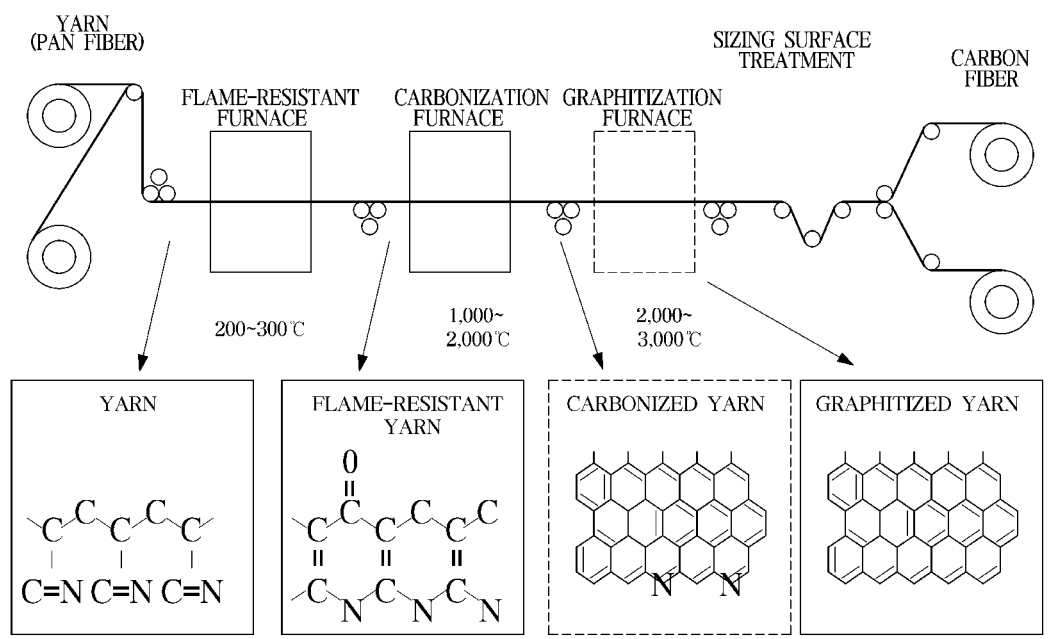
FIG. 7 is a view illustrating a process of preparing a carbon fiber using a PAN-based fiber as a yarn.

FIG. 7 is a view illustrating a process of preparing a carbon fiber using a PAN-based fiber as a yarn.

Referring to FIG. 7, the carbon fiber may be prepared using the following method. First, as the PAN fiber as a yarn receives a certain tensile force in an oxidizing or air atmosphere while passing through a flame-resistant furnace at 200° C. to 300° C., a flame-resistant yarn having a ring-shaped structure is prepared.

Next, the flame-resistant yarn is supplied to a carbonization furnace at 1,000° C. to 2,000° C., a ring of the flame-resistant yarn causes carbonization, and thus a carbonized yarn is prepared.

Meanwhile, the carbonized yarn is selectively supplied to a graphitization furnace of 2,000° C. to 3,000° C., the carbonized yarn passes through the graphitization furnace, and thus a graphitized yarn is prepared.

Next, the graphitized yarn is subjected to a sizing surface treatment process, and thus a final fiber is prepared.

The glass fiber, which is an industrial fiber according to still another embodiment, is roughly classified into a chopped long glass fiber having a diameter of 7 μm to 12 μm, glass wool having a diameter of 4 μm to 6 μm, a micro fiber having a diameter of 0.3 μm to 3 μm, and the like according to a diameter thereof.

According to the disclosed embodiment, the glass fiber may be made of E-glass fibers specified in ASTM D578. The glass fiber may include one or more selected from the group including $Al_2O_3$, $SiO_2$, and CaO.

Meanwhile, the glass fiber may further include one or more selected from the group including $B_2O_3$, F, MgO, and $Fe_2O_3$ according to the preparing process After the polyamide-based resin is impregnated into the above-described industrial fiber, the industrial fiber is joined together with the sintered ceramic plate material 24 at a temperature of 150° C. to 250° C. in a hot press facility, and thus the top plate of the induction heating apparatus 1, that is, an integrated cooking plate 20, may be manufactured.

According to the induction heating apparatus 1 which is provided in this way and to which the sintered ceramic plate material 24 and the reinforcement material layer 25 are applied, the following effects can be expected.

First, as the sintered ceramic plate material instead of the heat-resistant glass is applied as a material of the top plate of the induction heating apparatus, that is, the cooking plate, the degree of freedom in the pattern of the exterior of the induction heating apparatus can be secured, and a current specification content range of the induction heating apparatus, such as a bending strength, an adhesive force, and a free fall impact strength, can be satisfied.

In detail, the bending strength of the manufactured cooking plate 20 according to JIS A 1509-4 standard, for example, specified at least at the time of filing of the present application, is 600 N or more, the adhesive force in Peel Test according to ASTM standard is 120 N or more, the free fall impact strength is 3.2 J or more, and thus sufficient strength can be secured. The thermal expansion coefficient of the sintered ceramic plate material disposed on the uppermost surface of the cooking plate 20 is in the range of $10^{-6} \cdot K^{-1}$ to $3*10^{-6} \cdot K^{-1}$, and when the sintered ceramic plate material is applied to the induction heating apparatus, an operating temperature range of 300° C. or more can be secured.

Hereinafter, an experiment for measuring physical properties of the cooking plate 20 according to the material of the reinforcement material layer 25 constituting the cooking plate 20 according to the disclosed embodiment will be described in detail. The embodiments, which will be described below, are merely to help understanding of the disclosure, and the technical spirit of the disclosure is not limited by the embodiments which will be described below.

The sintered ceramic plate material was prepared by mixing an LAS or MAS material containing $Al_2O_3$ and $SiO_2$ as main components with clay, pressing the mixture using the continuous high pressure belt pressing apparatus, and drying-glazing-sintering the mixture. In this case, the sintering process was performed at 1,150° C.

Thereafter, after a powder-type polyamide-based resin having a decomposition temperature of 300° C. or more was impregnated into the industrial fiber having characteristics according to Table 1, the industrial fiber was joined together with the sintered ceramic plate material in a hot press facility at a temperature of 200° C., and thus the cooking plate 20 of the induction heating apparatus was manufactured.

TABLE 1

| Classification | | Example 1 | Example 2 | Example 3 |
|---|---|---|---|---|
| Type of Fiber | | Glass Fiber | Carbon Fiber | Aramid Fiber |
| Spec. | | E-Glass #570 | 12K 450P | P-aramid |
| Denier | | 5,300 | 7,290 | 3,000 |
| Tensile Strength (kgf) | | 37.5 | 62.1 | 70 |
| Tenacity (g/d) | | 7.1 | 8.5 | 23 |
| Elongation at Breaking (%) | | 3.9 | 1.4 | 3.9 |
| Modulus (g/d) | | 1130 | 873 | 550 |
| Toughness | | 13.9 | 10.1 | 60 |
| Fabric Weight (g/m²) | | 577.4 | 465.5 | 363 |
| Fabric Density | Warp | 6.1 | 7.1 | 13 |
| (ea/inch) | Weft | 6.1 | 7.1 | 13 |

In Example 1, a fabric woven with a glass fiber (E-Glass #570) was used as the industrial fiber applied to the reinforcement material layer of the sintered ceramic plate material. The fabric woven with the glass fiber has a warp and weft density of 6.1×6.1.

In Example 2, a fabric woven with a carbon fiber (12K 450P) having 7,290 den was used as the industrial fiber applied to the reinforcement material layer of the sintered ceramic plate material. The fabric woven with the carbon fiber has a warp and weft density of 7.1×7.1.

In Example 3, a fabric woven with an aramid fiber having 3000 den was used as the industrial fiber applied to the reinforcement material layer of the sintered ceramic plate material. The fabric woven with the aramid fiber has a warp and weft density of 13×13.

Meanwhile, in Comparative example 1, the heat-resistant glass was applied as the material of the cooking plate according to the related art.

Table 2 shows evaluation of mechanical properties (bending strength, adhesive adhesion, free fall strength) and results of heat resistance properties of the cooking plate (Examples 1 to 3 and Comparative Example 1) according to the types of materials applied to the reinforcement material layer introduced in the present disclosure in order to reinforce the sintered ceramic plate material.

Physical properties of the cooking plate were measured by the following method.
Bending Strength (JIS a 1509-4)

The cooking plate was produced in the size of 150 mm×300 mm and was placed on two support rods. In this case, the length from the center of each support rod to the edge of the plate material was about 5 mm. Next, a load was applied at a rate of $(1\pm2)N/mm^2$ every second using a pressure rod installed at an upper end of the center between the two support rods, a breaking load F that is the maximum load at a time of destruction of the plate material was calculated, and thus a bending breaking load S and a bending strength R of the plate material was measured.
Adhesive Adhesion A sample was manufactured by applying a polyurethane adhesive to the cooking plate, and then attaching a test strip having a size of 25 mm×200 mm thereto. When the adhesive was dried and the test strip was bonded to the cooking plate, the adhesive adhesion of the test strip with respect to a ceramic substrate was measured by pulling one end of the test strip.
Free Fall Impact Strength The free fall strength of the cooking plate was measured by fixing the cooking plate to an upper end of expanded foam and freely dropping a weight onto an upper end of the cooking plate. An impact strength applied to the cooking plate was adjusted while changing the weight of the weight and a point at which the weight is dropped.

TABLE 2

| Classification | Example 1 | Example 2 | Example 3 | Comparative Example 1 |
|---|---|---|---|---|
| Material | Glass Fiber | Carbon Fiber | Aramid Fiber | — |
| Spec. | E-Glass #570 | 12K 450P | P-aramid | Heat-resistant glass |
| Bending strength (N) | 1,100 | 1,500 | 800 | 1,500 |
| Resin Adhesion (N) | 120 | 120 | 120 | — |
| Free fall impact strength (J) | 2.4 | 3.2 | 2.4 | 3.2 |
| Thermal expansion coefficient ($10^{-6} \cdot K^{-1}$) | 2.5~2.8 | 0.8 | −0.1 | 0.5 |

In Table 2, the required properties for each property were evaluated on the basis of whether the corresponding cooking plate is applicable to the top plate of the induction heating apparatus. In detail, the properties of the cooking plate were evaluated on the basis of whether the bending strength is 600 N or more, whether the adhesive adhesion is 120 N or more, and whether a free fall impact strength test condition of 3.2 J or more is satisfied.

Referring to Tables 1 and 2, it could be identified that when applying the reinforcement material layer obtained by impregnating the polyamide-based resin into the industrial fiber according to the present disclosure, the strength or heat-resistant properties that are larger than or equal to those of the heat-resistant glass used as a material of an existing cooking plate can be secured.

In detail, Examples 1 to 3 are cases in which the glass fiber, the carbon fiber, and the aramid fiber were used as the industrial fiber, and Comparative Example 1 is a case in which existing heat-resistant glass was used instead of the industrial fiber. In Examples 1 to 3, the bending strengths were 1,100 N, 1,500 N, and 800 N, the adhesive adhesion was 120 N, and the free fall impact strength were 2.4 J, 3.2 J, and 2.4 J, respectively.

It could be identified that in all of Examples 1 to 3, the bending strength, the adhesive adhesion, and the free fall impact strength satisfy required physical property criteria for testing.

In particular, it could be identified that in Example 2, results of the bending strength, the adhesive adhesion, and the free fall impact strength are the best, and thus this case is most suitable as the material of the cooking plate.

Meanwhile, it could be identified that in all of Examples 1 to 3, the thermal expansion coefficient was $3*10^{-6} \cdot K^{-1}$ or less, and thus satisfied the required physical property criterion for heat resistance testing.

In the induction heating apparatus according to the disclosed embodiment as described above, by applying the sintered ceramic plate material to the material of the cooking plate, the heat-resistant properties and the degree of freedom in a pattern of the exterior can be secured. Further, by introducing the reinforcement material layer obtained by impregnating the polyamide-based resin into the industrial fiber, the bending strength, the adhesion, and the free fall impact strength can satisfy a current specification content range of the induction heating apparatus. Thus, the heat-resistant glass used as the material of the cooking plate can be replaced.

As is apparent from the above description, an induction heating apparatus including a cooking plate having an improved structure to ensure strength and heat-resistant properties can be provided.

Accordingly, the heat-resistant glass used as the material of the existing cooking plate can be replaced.

Hereinabove, the specific embodiments have been illustrated and described. However, the present disclosure is not limited to the above-described embodiments, and those skilled in the art to which the present disclosure pertains may derive various changes without departing from the subject matter of the technical spirit of the disclosure described in the appended claims.

What is claimed is:

1. An induction heating apparatus comprising:
a cooking plate on which a cooking container is to be seated; and
a plurality of induction heating coils installed below the cooking plate and configured to generate a magnetic field,
wherein the cooking plate being formed of:
a sintered ceramic material; and
a reinforcement material layer bonded with an adhesive to a lower surface of the sintered ceramic material, the reinforcement material layer including a polyamide-based resin and a fabric woven with an industrial fiber, to reinforce a strength of the sintered ceramic material.

2. The induction heating apparatus of claim 1, wherein the sintered ceramic material is formed to have a flat shape and a thermal expansion coefficient of the sintered ceramic material is in a range of $10^{-6} \cdot K^{-1}$ to $3*10^{-6} \cdot K^{-1}$.

3. The induction heating apparatus of claim 1, wherein a thickness of the sintered ceramic material is in a range of 3 mm to 12 mm.

4. The induction heating apparatus of claim 1, wherein the sintered ceramic material includes clay and Li2O—Al2O3-SiO2 (LAS) or MgO—Al2O3-SiO2 (MAS).

5. The induction heating apparatus of claim 1, wherein the cooking plate further includes a glaze coating layer formed on an upper surface of the sintered ceramic material.

6. The induction heating apparatus of claim 1, wherein the industrial fiber includes one or more fibers selected from a group including an aramid fiber, a carbon fiber, and a glass fiber.

7. The induction heating apparatus of claim 1, wherein a weight ratio of the industrial fiber is in a range of 200 g/m² to 800 g/m².

8. The induction heating apparatus of claim 6, wherein the aramid fiber includes a p-aramid fiber having a polymer including p-phenylene diamine (PPD) and terephthaloyl chloride (TPC).

9. The induction heating apparatus of claim 6, wherein the industrial fiber includes a woven aramid fiber in a range of 1,000 denier to 6,000 denier.

10. The induction heating apparatus of claim 1, wherein the industrial fiber includes a glass fiber selected from a group including $Al_2O_3$, $SiO_2$, and CaO.

11. The induction heating apparatus of claim 10, wherein the glass fiber further includes one or more selected from the group including $B_2O_3$, F, MgO, and $Fe_2O_3$.

12. The induction heating apparatus of claim 1, wherein a carbon fiber is used as the industrial fiber and the carbon fiber includes a polyacrilonitrile (PAN) fiber as a yarn.

13. The induction heating apparatus of claim 1, wherein the polyamide-based resin is provided in a powder form.

14. The induction heating apparatus of claim 1, wherein a decomposition temperature of the polyamide-based resin is 300° C. or more.

15. The induction heating apparatus of claim 1, wherein the sintered ceramic material is provided by being pressed with a continuous high pressure belt press apparatus and by being subjected to a drying process, a glazing process, and a sintering process.

16. The induction heating apparatus of claim 15, wherein a sintering temperature is in a range of 1,000° C. to 1,300° C.

17. The induction heating apparatus of claim 1, wherein a ratio of an area occupied by pores per unit surface area of the sintered ceramic material is in a range of 10% to 15%.

18. The induction heating apparatus of claim 1, wherein a thickness of the reinforcement material layer is in a range of 0.1 mm to 1.0 mm.

19. The induction heating apparatus of claim 1, wherein a bending strength of the cooking plate according to JIS A 1509-4 standard is 600 N or more.

20. The induction heating apparatus of claim 1, wherein the sintered ceramic material is stackable on the reinforcement material layer at a temperature of 150° C. to 250° C.

* * * * *